US008694525B2

(12) United States Patent
Christie et al.

(10) Patent No.: US 8,694,525 B2
(45) Date of Patent: Apr. 8, 2014

(54) SYSTEMS AND METHODS FOR PERFORMING INDEX JOINS USING AUTO GENERATIVE QUERIES

(75) Inventors: Douglass Adam Christie, Morrisville, NC (US); Gordon Lyle Keener, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 186 days.

(21) Appl. No.: 13/168,424

(22) Filed: Jun. 24, 2011

(65) Prior Publication Data

US 2012/0330988 A1 Dec. 27, 2012

(51) Int. Cl.
*G06F 17/30* (2006.01)

(52) U.S. Cl.
CPC .... *G06F 17/30864* (2013.01); *G06F 17/30398* (2013.01)
USPC ............................ 707/759; 707/669; 707/714

(58) Field of Classification Search
CPC ..................... G06F 17/30864; G06F 17/30398
USPC .......................................... 707/669, 714, 759
See application file for complete search history.

(56) References Cited

U.S. PATENT DOCUMENTS

| 5,848,408 | A  | * | 12/1998 | Jakobsson et al. | 707/714 |
| 7,016,910 | B2 | * | 3/2006  | Egilsson et al.  | 707/705 |
| 7,676,450 | B2 | * | 3/2010  | Ahmed et al.     | 707/716 |
| 8,019,750 | B2 | * | 9/2011  | Kosciusko et al. | 707/718 |
| 2004/0267752 | A1 | * | 12/2004 | Wong et al.   | 707/783 |
| 2005/0091188 | A1 | * | 4/2005  | Pal et al.    | 707/705 |
| 2006/0101011 | A1 |   | 5/2006  | Lindsay et al.|         |
| 2007/0038618 | A1 | * | 2/2007  | Kosciusko et al. | 707/713 |
| 2009/0234799 | A1 |   | 9/2009  | Betawadkar-Norwood et al. | |
| 2010/0082671 | A1 |   | 4/2010  | Li et al.     |         |
| 2010/0094847 | A1 | * | 4/2010  | Malan et al.  | 707/705 |
| 2010/0094851 | A1 |   | 4/2010  | Bent et al.   |         |
| 2010/0332454 | A1 | * | 12/2010 | Prahlad et al.| 707/654 |
| 2011/0137966 | A1 | * | 6/2011  | Srinivasan et al. | 707/828 |

OTHER PUBLICATIONS

O'Neil, Patrick et al., "Multi-Table Joins Through Bitmapped Join Indices", SIGMOND Record, vol. 24, No. 3, Sep. 1995, pp. 8-11.*

(Continued)

*Primary Examiner* — Shahid Alam
(74) *Attorney, Agent, or Firm* — Kilpatrick Townsend & Stockton LLP

(57) ABSTRACT

In accordance with the teachings described herein, systems and methods are provided for performing index joins. A database management application may receive an instruction to perform an index join operation between columns in a first table and a second table, wherein the database management application does not have direct access to an index of the first table or the second table for performing the index join operation. A query may be automatically generated by the database management application, wherein the query includes a where clause equality expression that equates an indexed column of the second table with a parameter or updatable constant. The database management application may substitute a value from a row of the first table may for the parameter or updatable constant, and cause the query to be executed on the index of the second table to fetch any one or more rows of the second table that satisfy the where clause by having an index value that matches the substituted value. The database management application may then repeat the substituting and executing operations for each row of the first table, and perform the index join operation using the fetched one or more rows.

19 Claims, 9 Drawing Sheets

(56) References Cited

OTHER PUBLICATIONS

Ganski et al., Optimization of Nested SQL Queries Revisited (1987) retrieved from http://thelackthereof.org/docs/library/cs/database/Wong,%20Harry%3A%20Optimization%20of%20Nested%20SQL%20Queries%20Revisited.pdf Dec. 4, 2013, pp. 23-33.

Seshadri et al., "Complex Query Decorrelation" (1996) retrieved from http://library.riphah.edu.pk/acm/disk__1/text/2-7/ICDE96/P450.pdf Dec. 4, 2013, pp. 450-458.

Non-Final Office Action of Oct. 25, 2013 for U.S. Appl. No. 13/273,875, 14 pages.

\* cited by examiner

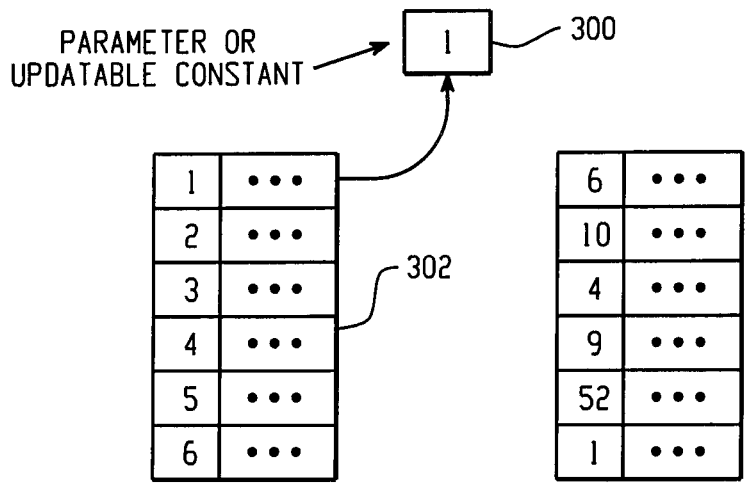
Fig. 4
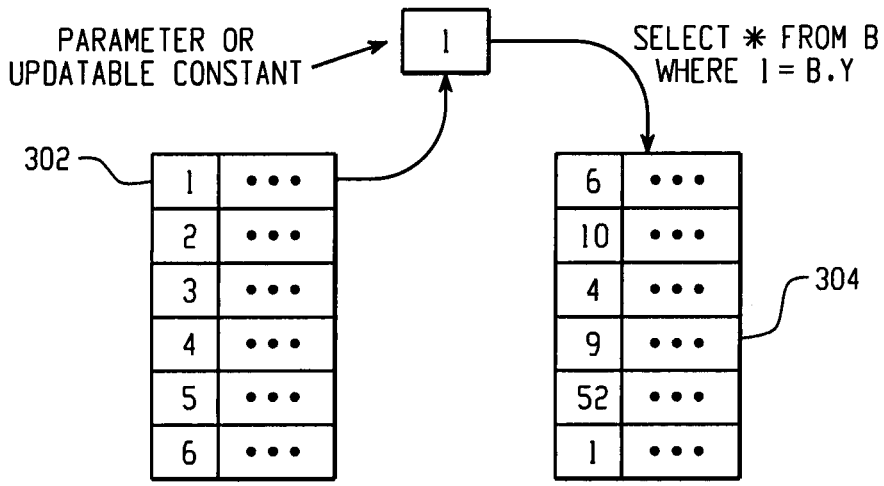
Fig. 5
Fig. 6

SYSTEMS AND METHODS FOR PERFORMING INDEX JOINS USING AUTO GENERATIVE QUERIES

FIELD

The technology described in this patent document relates generally to computer-implemented database systems and more particularly to index join operations.

BACKGROUND

In the field of query processing, tables can often be stored on multiple databases, as illustrated in FIG. 1. To process a query, tables are typically copied from each database, and any data manipulations or comparisons are then performed in a local memory space. In the example illustrated in FIG. 1, Table A is located in one foreign database and Table B is located in another foreign database. In order to join Tables A and B together on columns X and Y respectively, the following SQL join expression may be submitted to the SQL processor, "select * from A inner join B on A.X.=B.Y". In this example, both Tables A and B would typically be copied to the SQL processor to perform the join, with the comparison of columns X and Y being performed locally, as illustrated in FIG. 1. This operation may often be very resource and time intensive.

SUMMARY

In accordance with the teachings described herein, systems and methods are provided for performing index joins. A database management application may receive an instruction to perform an index join operation between columns in a first table and a second table, wherein the database management application does not have direct access to an index of the first table or the second table for performing the index join operation. A query may be automatically generated by the database management application, wherein the query includes a where clause equality expression that equates an indexed column of the second table with a parameter or updatable constant. The database management application may substitute a value from a row of the first table may for the parameter or updatable constant, and cause the query to be executed on the index of the second table to fetch any one or more rows of the second table that satisfy the where clause by having an index value that matches the substituted value. The database management application may then repeat the substituting and executing operations for each row of the first table, and perform the index join operation using the fetched one or more rows.

BRIEF DESCRIPTION OF THE DRAWINGS

FIG. 4-6 provide an example to help further illustrate the operation of the systems of FIGS. 2 and 3.

DETAILED DESCRIPTION

Figure 2:
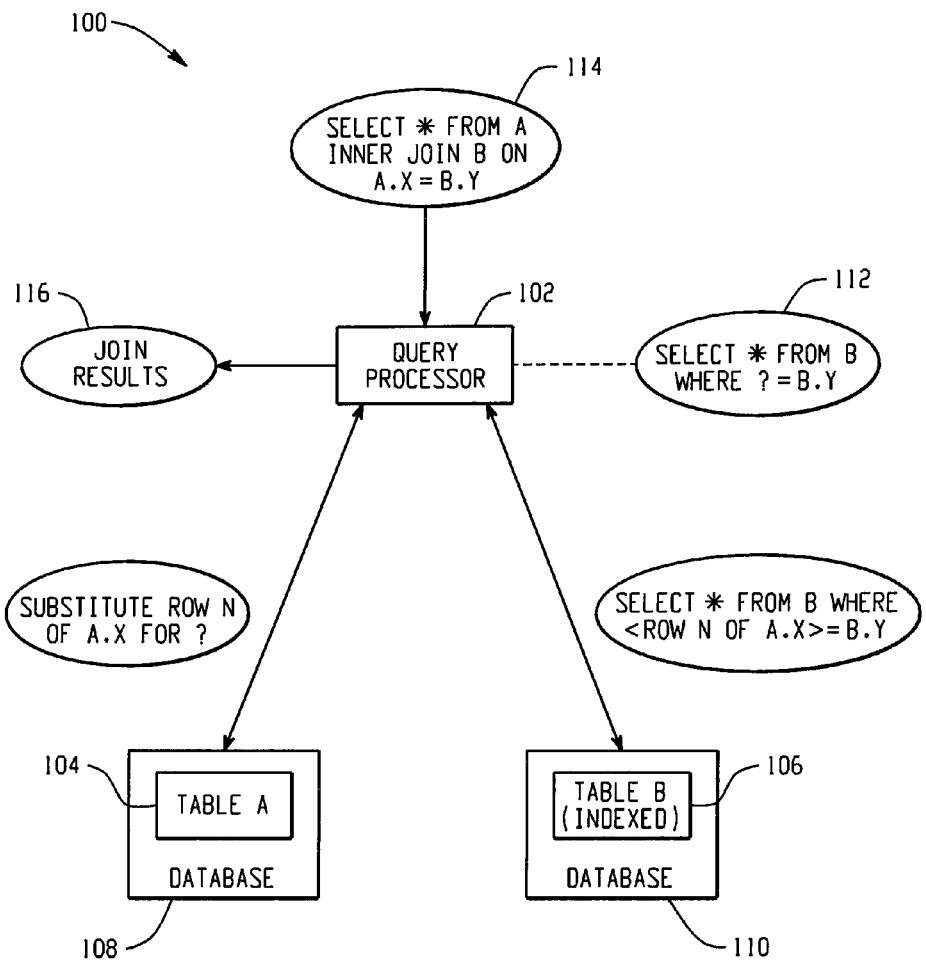
FIG. 2 is block diagram of an example system for performing an index join operation.

FIG. 2 is block diagram of an example system 100 for performing an index join operation by providing a mechanism to enable the query processor 102 to utilize an indexed column(s) in one of the tables 104, 106 to be joined. The query processor 102 and the tables 104, 106 may, for example, be included in a federated database system. For instance, the query processor 102 may be an SQL processor executing within a database management system. The tables 104, 106 are stored in one or more databases 108, 110, which may be either local or remote to the query processor 102. One or more of the tables 104, 106 may be indexed, meaning that the table includes an associated index on one or more columns in the table. A database 108, 110 may, for example, create a table index utilizing a technique that scans the table and stores the identifiers for each into a btree that is keyed on members of the index. The index for a table 104, 106 may identify the set of unique values contained in one or more columns of the table, and, for each of these values, may identify the specific row(s) in the table where the columns contains that value. The index may either be part of the table 104, 106 or may be a separate object that is associated with the table.

In operation, the query processor 102 uses a where clause equality expression to leverage the table index of database 110 in order to fetch the necessary data for performing the index join operation. More specifically, once the query processor 102 detects that the column(s) in at least one of the tables 106 to be joined is indexed, a query 112 is automatically generated with a parameterized where clause equality expression, which is submitted to the database and performed for each row of the non-indexed table 104. It should be understood that in certain examples columns in both tables 104 and 106 may be indexed, but since the query processor 102 only utilizes the index from one of the tables (table B in the illustrated example), the other table is referred to herein as the "non-indexed" table for simplicity. In the case where the columns of both tables 104 and 106 are indexed, the query processor 102 may utilize some predetermined criteria, such as selecting the larger of the two tables, to determine which table will be utilized as the "indexed table" and which will be the "non-indexed" table for the purposes of the join operation.

To help illustrate the operation of the query processor 102, consider the example join expression 114, "select * from A inner join B on A.X=B.Y", that is input to the query processor 102 in FIG. 2. It should be understood, however, that the index join operation described herein may also be utilized for other types of join operations in addition to an inner join, such as a left or right outer join. Upon receiving the join expression 114 and detecting that at least one of the identified columns (B.Y in this example) is indexed, the query processor 102 automatically generates a new query 112, as follows:

select * from B where ?=B.Y

The where clause in the above query equates the indexed column, B.Y, from Table B 106 with the parameter "?". If the query is accepted by the database, then the query processor 102 can substitute values from each row from column A.X of the non-indexed table 102 for the parameter "?", and cause the query to be executed on the table index to fetch only the rows from the indexed table 106 that satisfy the where clause by having an index value that matches the substituted value. The fetched rows may then be used by the query processor 102 to generate the join results 116. In this way, the query processor 102 is able to leverage the index of the database 106 to carry out the join operation 114, even though the query processor 102 does not have direct access to the index.

It should be understood that the industry-standard ODBC interface, that enables client applications to access a variety of databases through a common API, allows applications to discover information about indices (via SQLStatistics( )) which exist on underlying database tables. However, the standard interface does not provide a mechanism to allow clients to directly access these indices. For example, a standard application cannot SQLFetch(key=42) to obtain rows in which the value of key is 42; it must use a separate query, "select * from B where key=42", and trust that the database will use the index instead of doing a full table scan, or use parameters via " . . . where key=?" and re-execute the parameterized query for each value of interest.

Figure 3:
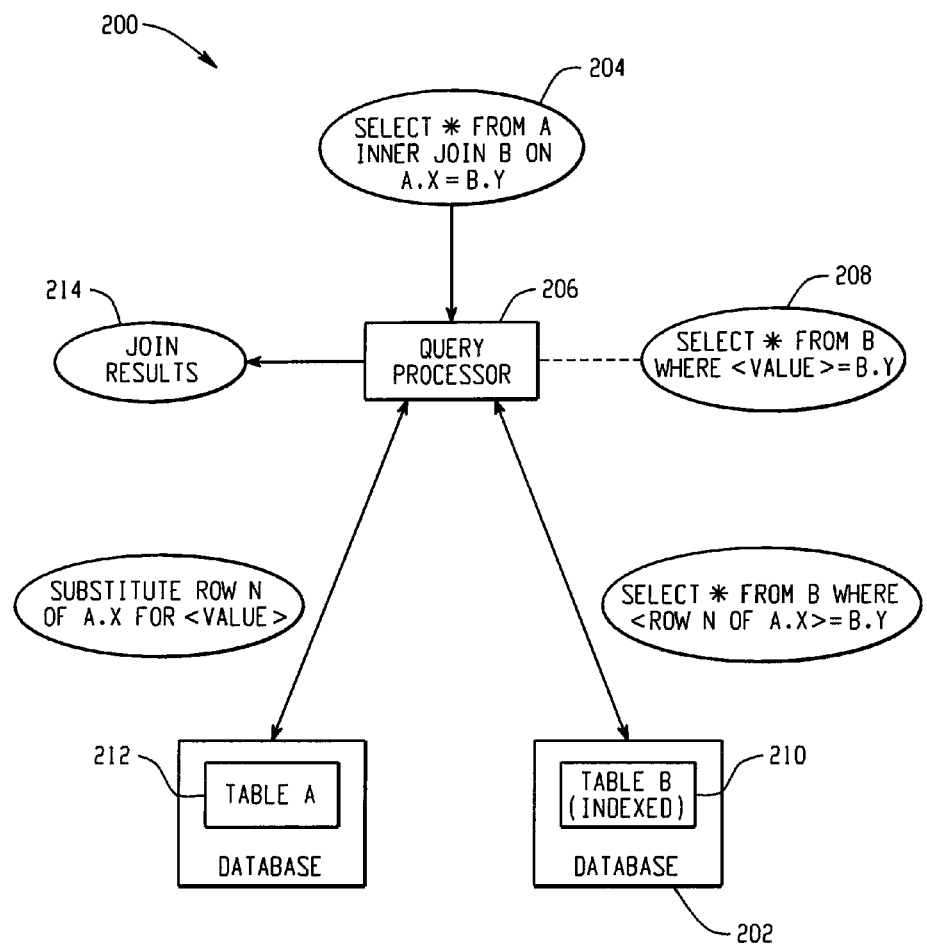
FIG. 3 is a block diagram of another example system for performing an index join operation.

FIG. 3 illustrates another example 200 that may be utilized with a database 202 that does not support parameters. In this situation, an updateable constant may be used in the where expression instead of a parameter. For instance, upon receiving the join expression 204 and detecting that at least one of the identified columns is indexed, the query processor 206 may allocate a memory location for the updateable constant value and then automatically generate, in an internal query form, a query 208 with a where clause equality expression that equates the updateable constant with an indexed column of the table 210. The query 208 may then be executed by the query processor 206 for each row of the non-indexed table 212, with the row from the non-indexed table 212 being fetched and substituted for the updatable constant within the allocated memory location.

To help illustrate the operation of the query processor 206, consider again the example join expression 204, "select * from A inner join B on A.X=B.Y". Upon receiving this join expression 204 and detecting that at least one of the identified columns (B.Y in this example) is indexed and that the database 202 does not support parameters, the query processor 206 automatically generates a new query 208 in an internal query form, as follows:

select * from B where <value>=B.Y

The where clause in the above query equates the indexed column, B.Y, from Table B 210 with the updatable constant <value>, where <value> points within the internal query form to an allocated memory location. The query processor 206 can then substitute values from each row from column A.X of the non-indexed table 212 for the updatable constant, and execute the query on the table index to fetch only the rows from the indexed table 210 that satisfy the where clause by having an index value that matches the substituted value. The fetched values may then be used by the query processor 206 to generate the join results 214.

FIGS. 4-6 provide an example to help further illustrate the operation of the systems of FIGS. 2 and 3. As shown in FIG. 4, the example includes two tables, Table A and Table B, each having one column with six rows containing integers. Table B is indexed and Table A is non-indexed. As explained above with reference to FIGS. 2 and 3, upon receiving the join expression, "select * from A inner join B on A.X=B.Y", and detecting that at least Table B is indexed, the query processor will automatically generate a query having a where clause equality expression that equates an indexed column (B.Y) of Table B with a parameter or updatable constant.

As shown in FIG. 5, the query processor allocates a memory location 300, such as an address space, for the parameter or updatable constant. The first row value from the non-indexed table 302 is then fetched and copied into the parameter or updatable constant memory location 300. In the illustrated example, an integer value of "1" is copied from the first row of the non-indexed table 302 into the allocated memory location 300. The query processor may then substitute the fetched value ("1") for the parameter or updatable constant, and execute the query against the database's table index, as shown in FIG. 6. Specifically, in the illustrated example the fetched integer value "1" is substituted for the parameter or updatable constant to execute the query, "select * from B where 1=B.Y", on the indexed table 304. The result(s) of this query is then fetched from the indexed table, and the process shown in FIGS. 5 and 6 is repeated for each row in the non-indexed table 302.

With reference to FIG. 6, it should be appreciated that upon completion of the query for each row of the non-indexed table 302, only three of the six rows will be fetched from the indexed table 304; thus reducing the amount of data movement across the network. When the indexed table is very large, this process may significantly reduce the resources required to perform the join operation. This is particularly true when one or more of the databases is non-native to the database management system that is performing the join operation, as illustrated in FIG. 7.

Figure 7:
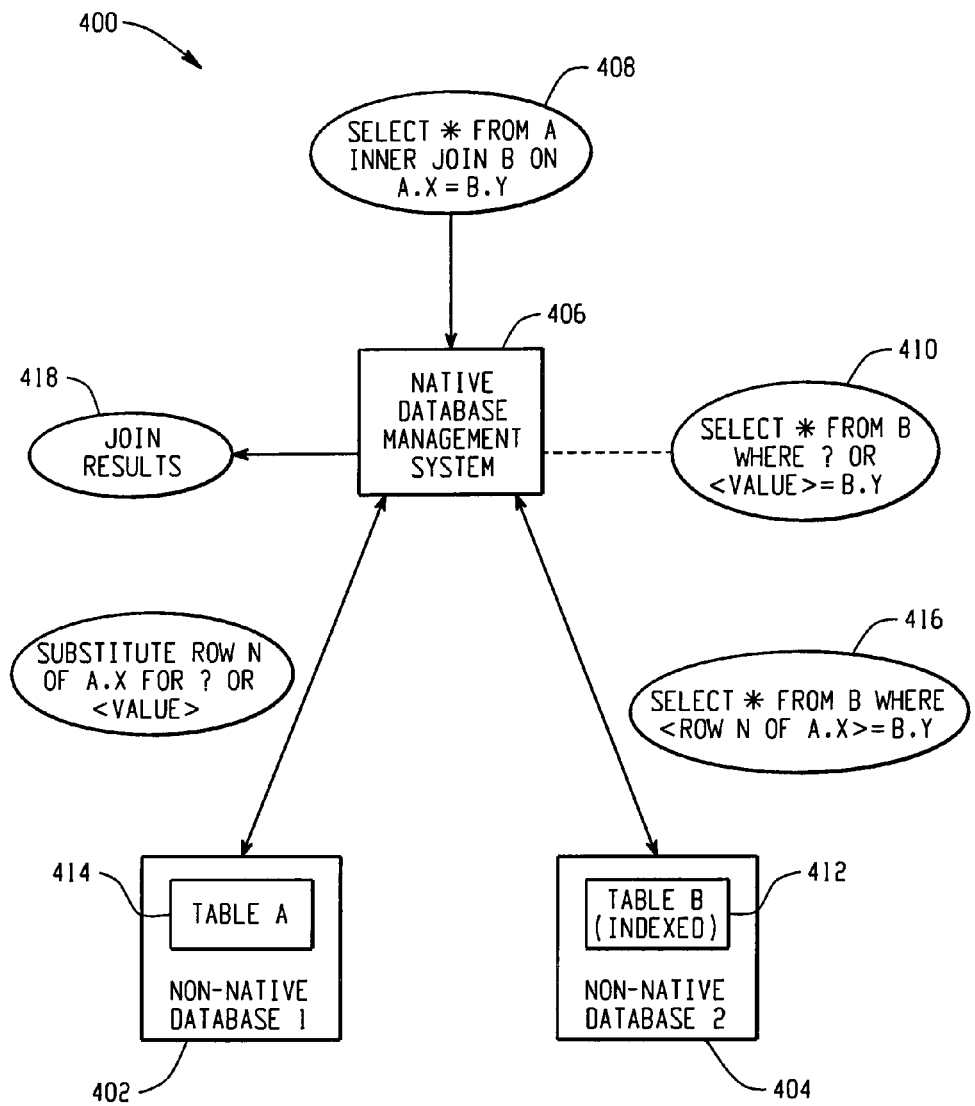
FIG. 7 is block diagram of an example system for performing an index join operation on tables that are stored in one or more non-native databases.

FIG. 7 is block diagram of an example system 400 for performing an index join operation on tables that are stored in one or more databases 402, 404 that are non-native to the database management system 406. For instance, the database management system 406 and the databases 402, 404 may be parts of a federated database system that integrates autonomous database platforms into a single federated database. The database management system 406 may, for example, include an SQL processor that processes SQL queries involving foreign databases 402, 404. In certain embodiments, as illustrated in FIG. 7, the SQL processor may operate on a different type of database platform than one or more of the databases 402, 404, i.e., a non-native database. Different types of database platforms may, for example, include those from SAS, Oracle, Sybase, Business Objects, Teradata and/or other providers.

As illustrated in FIG. 7, a where clause equality expression may be used by the native database management system 406 to leverage the table index in a non-native database 404 in order to fetch the necessary data for performing an index join operation, even though the native database management system 406 does not have direct access to the table index in the non-native database 404. Specifically, upon receiving a join expression 408 and detecting that at least one of the identified columns is indexed, the database management system 406 automatically generates a query 410 having a where clause equality expression that equates an indexed column of the table 412 with a parameter or updatable constant. A value from a row of the non-indexed table 414 is substituted for the parameter or updatable constant, and the resultant query 416 is executed on the index of table 412 to fetch any one or more rows that satisfy the where clause by having an index value that matches the substituted value. This process is then repeated for each row in the non-indexed table 414, fetching the necessary rows from the indexed table 412 for completing the join operation at the database management system 406 and generating the join results 418.

The index join operation described herein may be particularly advantageous in the case of non-native databases, as illustrated in FIG. 7. For non-native databases, where a network connection separates the join processor and the indexed table, the index join operation described herein may allow the SQL processor to only fetch the rows it needs, when it needs them, thus reducing network traffic. As an example, consider an indexed table that has 100 million rows in the table and each row has 300 columns, where each row is 800 bytes in length. The size of this example table would be 10 Gigabytes of data. In a non-native situation without access to the index, the entire 10 Gigabyte table would need to be transferred into the database management system 406. If only 5% of the rows (5 million rows) in the table match, then 95 million non-matching columns are moved into the database management system 406, resulting in 9.5 Gigabytes of data being unnecessarily copied to database management system 406. If data is transferred at a rate of 3 Megabytes/second, the time to transfer the whole table to the database management system 406 would be 55.5 minutes. However, if only the 5 million matching rows are copied to database management system 406 at the same rate, the amount of time it would take to copy the rows would be only 2.78 minutes. Further, this is only the amount of time to move the data across the network, and does not include the time necessary to perform the comparisons. Without utilizing the table index, the number of comparisons or searches to be performed in this example, depending the join techniques utilized, could be as high as 100 million times the number of rows in the table that is being joined. Therefore, utilizing the table index may substantially reduce the amount of data moved and may also reduce the number of look ups and comparisons that need to be performed.

Figure 8:
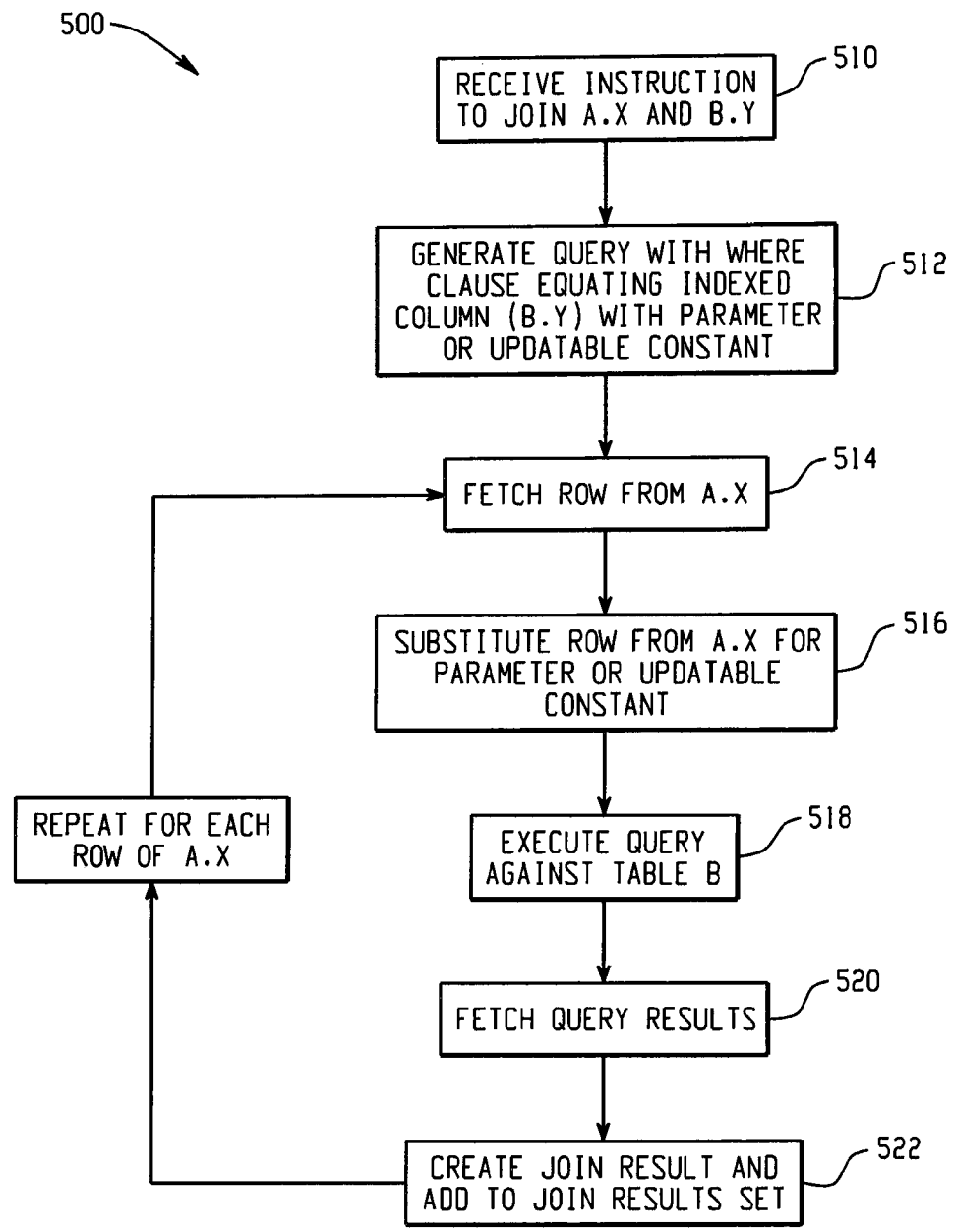
FIG. 8 is a flow diagram of an example method for performing an index join operation.

FIG. 8 is a flow diagram depicting an example method 500 for performing an index join operation. At 510, an instruction is received to join a column (X) in a first table (A) with a column (Y) in a second table (B). A query is then generated at 512 with a where clause equality expression that equates an indexed column (B.Y) with a parameter or updatable constant. Where the indexed table (B) is stored in a database that supports parameters, the query generated at 512 may be "select * from B where ?=B.Y", and where the database does not support parameters, the query may be "select * from B where <value>=B.Y".

At 514, a row is fetched from the non-indexed column (A.X), and the fetched value is substituted for the parameter or updatable constant at 516. The query is then executed against the index of table (B) at 518, and the query results are returned at 520. The join results for the fetched rows may then be generated and added to the join results set at 522. This process, from step 514 to step 522, is repeated for each row of the non-indexed column (A.X).

It should be understood that similar to the other processing flows described herein, one or more of the steps and the order in the flowchart may be altered, deleted, modified and/or augmented and still achieve the desired outcome.

Figure 1:
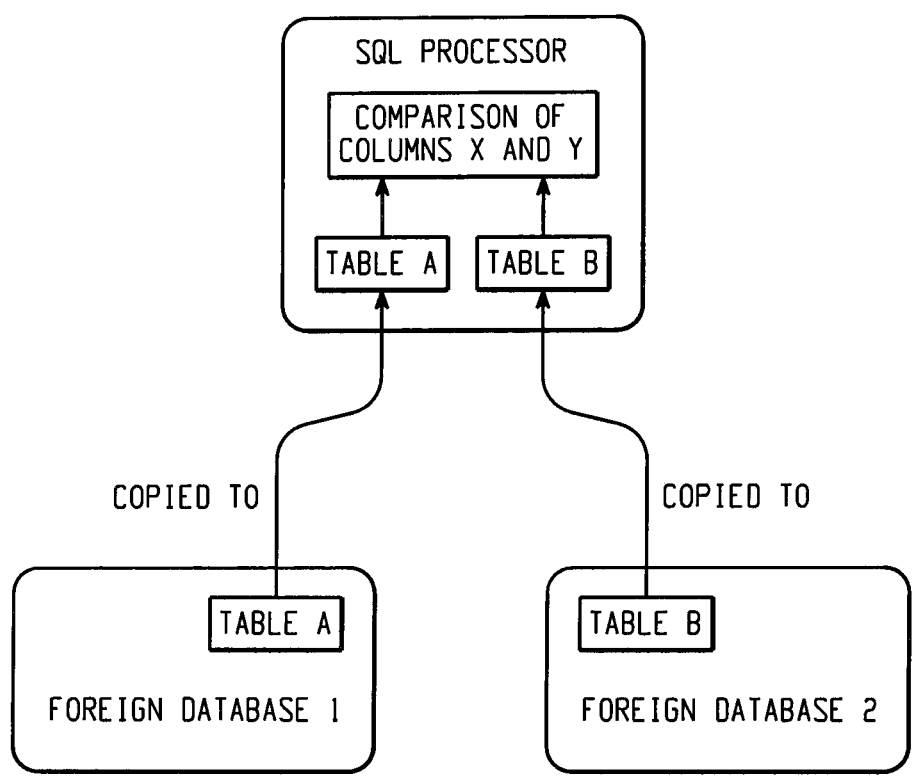
FIG. 1 is a block diagram of a typical system for performing a join operation in a federated database.
Figure 9:
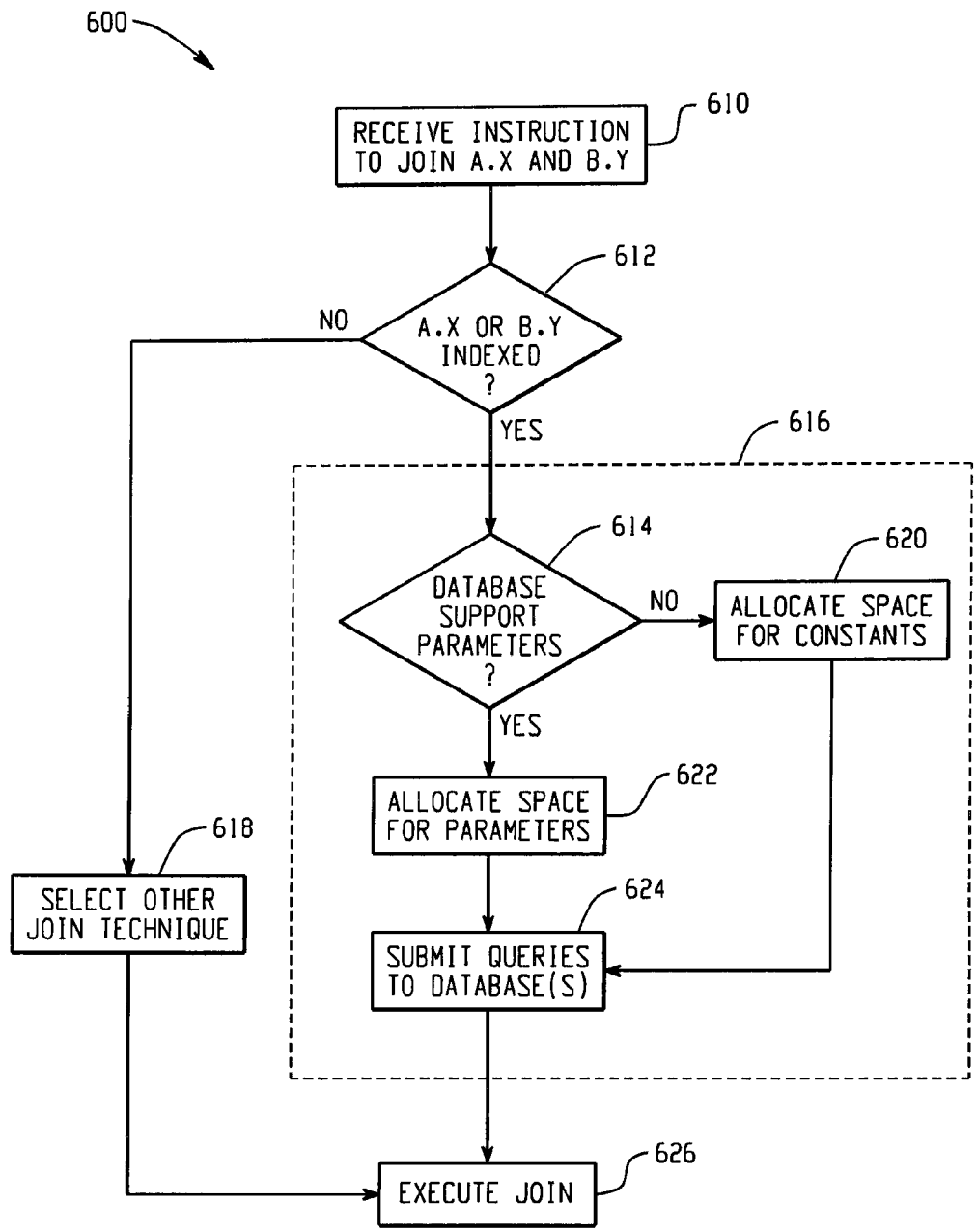
FIG. 9 is a flow diagram of a further method for performing an index join operation.

FIG. 9 depicts a further method 600 for performing an index join operation. At 610, an instruction is received to join a column (X) in a first table (A) with a column (Y) in a second table (B). The method then determines at 612 whether either of the columns (A.X or B.Y) identified in the join instruction are indexed in their respective database. If so, then the method proceeds to 614 to perform an index join operation 616. Otherwise, if neither column (A.X or B.Y) is indexed, then the method proceeds to 618 to select a different type of join procedure to complete the join instruction, such as the method described above with reference to FIG. 1.

At 614, the method determines whether the indexed table (B) is stored in a database that supports parameters. If not, then the index join procedure 616 is implemented using an updatable constant and a memory location of the updatable constant is allocated at 620. If the database does support parameters, then the index join procedure 616 is implemented using a parameter, and a memory location for the parameter value is allocated at 622.

At 624, a query having a where clause equality expression is generated that equates the indexed column with the parameter or updatable constant, and the query is executed on the indexed table for each row of the non-indexed table, for example using the method described above with reference to FIG. 8. The join operation is then executed at step 626.

Figure 10A:
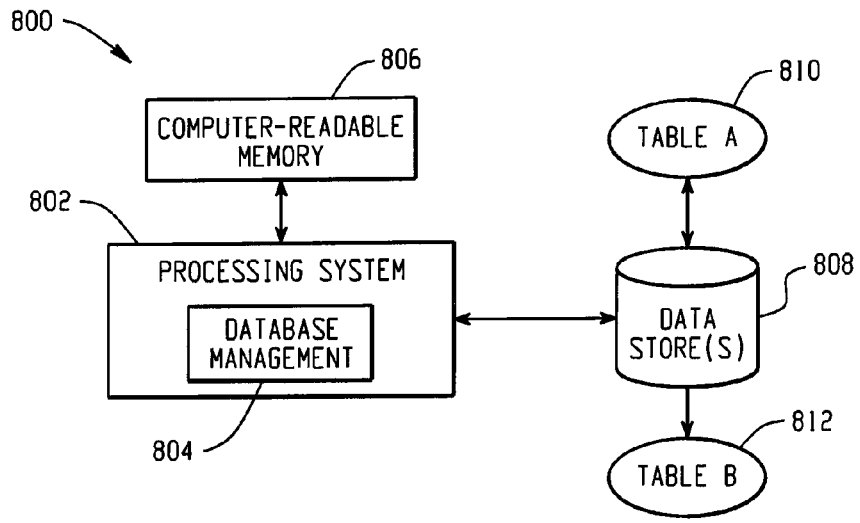
FIGS. 10A, 10B, and 10C depict examples of systems that may be used to implement an index join operation.
Figure 10B:
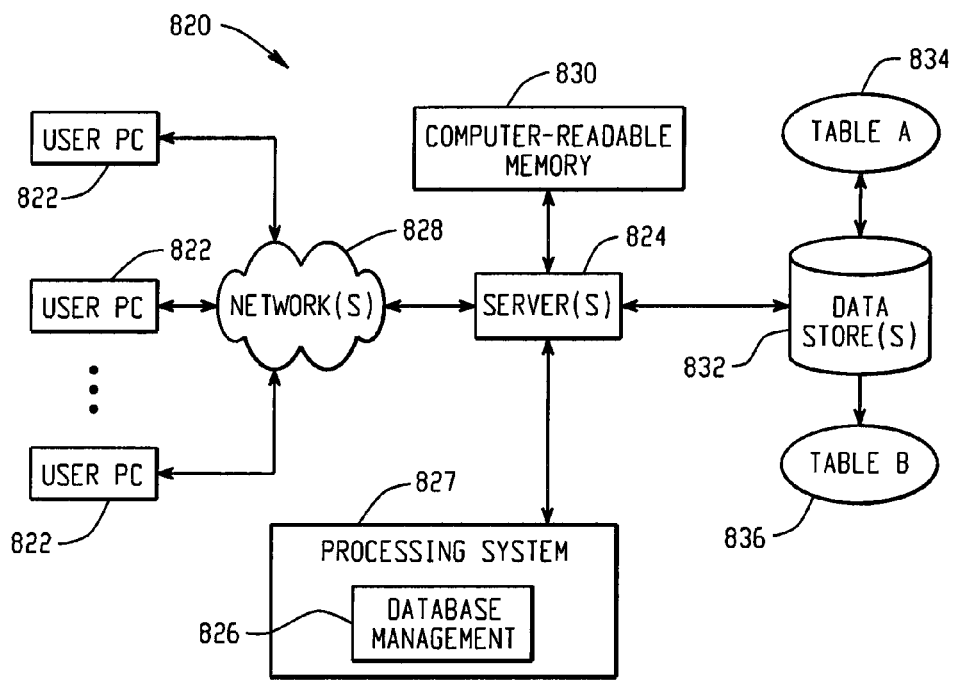
Figure 10C:
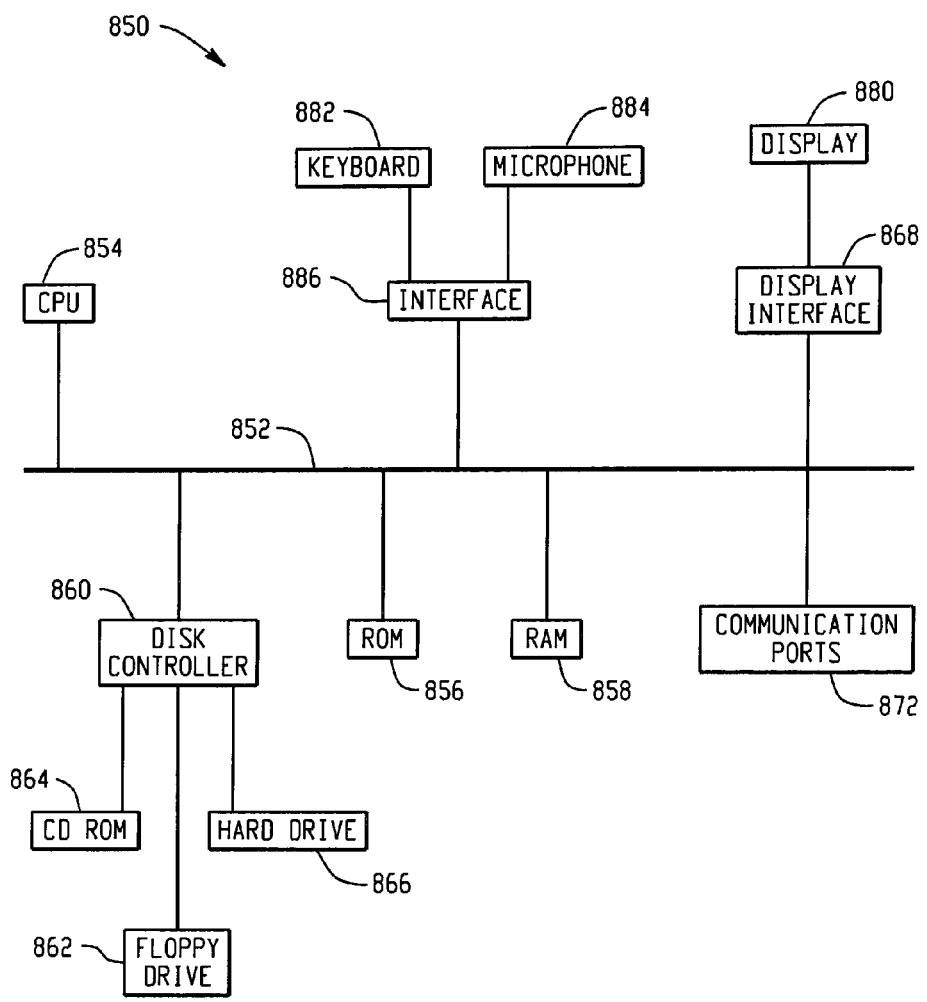

FIGS. 10A, 10B, and 10C depict examples of systems that may be used to implement an index join operation. For example, FIG. 10A depicts an example of a system 800 that includes a standalone computer architecture where a processing system 802 (e.g., one or more computer processors) includes a database management application 804 being executed on it. The processing system 802 has access to a computer-readable memory 806 in addition to one or more data stores 808. The one or more data stores 808 may include tables 810, 812 upon which the index join operation is to be performed.

FIG. 10B depicts a system 820 that includes a client server architecture. One or more user PCs 822 access one or more servers 824 running a database management program 826 on a processing system 827 via one or more networks 828. The one or more servers 824 may access a computer readable memory 830 as well as one or more data stores 832. The one or more data stores 832 may contain tables 834, 836 upon which the index join operation is to be performed.

FIG. 10C shows a block diagram of an example of hardware for a standalone computer architecture 850, such as the architecture depicted in FIG. 10A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method for performing index joins, comprising:
   receiving, at a query processor in a database management system, an instruction to perform an index join operation between a column in a first table and a column in a second table, wherein the query processor does not have direct access to an index of the first table or an index of the second table for performing the index join operation;
   determining that the column in the second table is indexed;
   automatically generating a query having a where clause equality expression that equates the column in the second table with a parameter or updatable constant, wherein the query is automatically generated in response to determining that the column in the second table is indexed;
   substituting a value from a row of the first table for the parameter or updatable constant;
   executing the query on the index of the second table, wherein executing the query includes fetching indexed values stored at any one or more rows of the second table that satisfy the where clause, wherein a row of the second table satisfies the where clause by storing an indexed value that matches the substitute value;
   repeating the substituting and executing steps for each row of the first table; and
   performing the index join operation using the fetched indexed values.

2. The method of claim 1, wherein the first table is non-indexed.

3. The method of claim 1, wherein both the first table and the second table are indexed.

4. The method of claim 1, wherein at least one of the first table and the second table is stored in a non-native database.

5. The method of claim 1, wherein the query comprises the following command:

$$\text{select * from } B \text{ where } ?=B.Y,$$

wherein B is an identification of the second table, ? is a parameter, and B.Y identifies the indexed column of the second table.

6. The method of claim 1, wherein the query comprises the following command:

$$\text{select * from } B \text{ where } <\text{value}>=B.Y,$$

wherein B is an identification of the second table, <value> is an updatable constant, and B.Y identifies the indexed column of the second table.

7. The method of claim 1, wherein the query processor and the first and second table are included in a federated database system.

8. A system for performing index joins, comprising:
   a database management application stored in a memory and executed by a processor, wherein the database management application includes instructions for causing the system to:
   receive an instruction to perform an index join operation between a column in a first table and a column in a second table, wherein the database management application does not have direct access to an index of the first table or an index of the second table for performing the index join operation;
   determine that the column in the second table is indexed;
   automatically generate a query having a where clause equality expression that equates the column of the second table with a parameter or updatable constant, wherein the query is automatically generated in response to determining that the column in the second table is indexed;
   substitute a value from a row of the first table for the parameter or updatable constant;
   execute the query on the index of the second table, wherein executing the query includes fetching indexed values stored at any one or more rows of the second table that satisfy the where clause, wherein a row of the second table satisfies the where clause by storing an indexed value that matches the substitute value;
   repeat the substituting and executing operations for each row of the first table; and
   perform the index join operation using the fetched indexed values.

9. The system of claim 8, wherein the first table is non-indexed.

10. The system of claim 8, wherein both the first table and the second table are indexed.

11. The system of claim 8, wherein at least one of the first table and the second table is stored in a non-native database.

12. The system of claim 8, wherein the query comprises the following command:

select * from *B* where ? =*B.Y*, wherein B is an identification of the second table, ? is a parameter, and B.Y identifies the indexed column of the second table.

13. The system of claim 8, wherein the query comprises the following command:

select * from *B* where <value>=*B.Y*, wherein B is an identification of the second table, <value> is an updatable constant, and B.Y identifies the indexed column of the second table.

14. A computer-program product for performing index joins, comprising:
   a processor; and
   a non-transitory computer-readable medium having instructions stored thereon, the instructions operable to cause a computer to:
receive an instruction to perform an index join operation between a column in a first table and a column in a second table, wherein a database management application does not have direct access to an index of the first table or an index of the second table for performing the index join operation;
   determine that the column in the second table is indexed;
   automatically generate a query having a where clause equality expression that equates the column of the second table with a parameter or updatable constant, wherein the query is automatically generated in response to determining that the column in the second table is indexed;
   substitute a value from a row of the first table for the parameter or updatable constant;
   execute the query on the index of the second table, wherein executing the query includes fetching indexed values stored at any one or more rows of the second table that satisfy the where clause, wherein a row of the second table satisfies the where clause by storing an indexed value that matches the substitute value;
   repeat the substituting and executing operations for each row of the first table; and
   perform the index join operation using the fetched indexed values.

15. The computer-program product of claim 14, wherein the first table is non-indexed.

16. The computer-program product of claim 14, wherein both the first table and the second table are indexed.

17. The computer-program product of claim 14, wherein at least one of the first table and the second table is stored in a non-native database.

18. The computer-program product of claim 14, wherein the query comprises the following command:

select * from *B* where ? =*B.Y*, wherein B is an identification of the second table, ? is a parameter, and B.Y identifies the indexed column of the second table.

19. The computer-program product of claim 14, wherein the query comprises the following command:

select * from *B* where <value>=*B.Y*, wherein B is an identification of the second table, <value> is an updatable constant, and B.Y identifies the indexed column of the second table.

* * * * *